Oct. 3, 1967    W. H. ATKINS    3,345,082

FLEXIBLE CABLE TOWING HITCH

Filed Jan. 28, 1965    3 Sheets-Sheet 1

William H. Atkins
*INVENTOR.*

BY *T. Eugene Burt*

ATTORNEY.

Oct. 3, 1967     W. H. ATKINS     3,345,082
FLEXIBLE CABLE TOWING HITCH
Filed Jan. 28, 1965     3 Sheets-Sheet 2
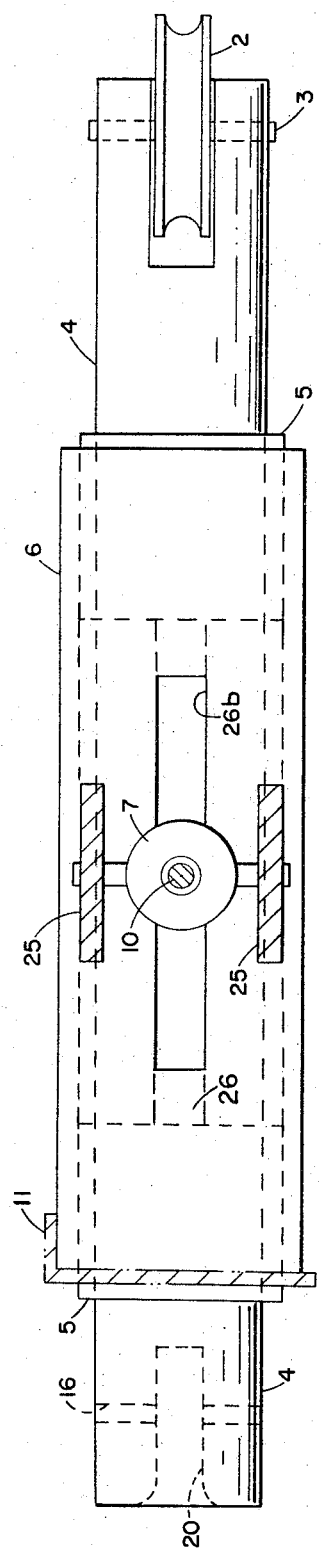
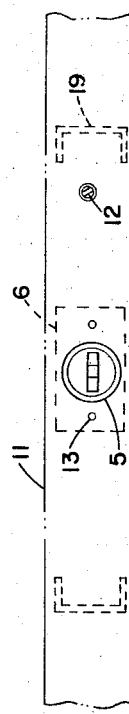
William H. Atkins
*INVENTOR.*
BY *T. Eugene Burts*
ATTORNEY Oct. 3, 1967 W. H. ATKINS 3,345,082
FLEXIBLE CABLE TOWING HITCH
Filed Jan. 28, 1965 3 Sheets-Sheet 3
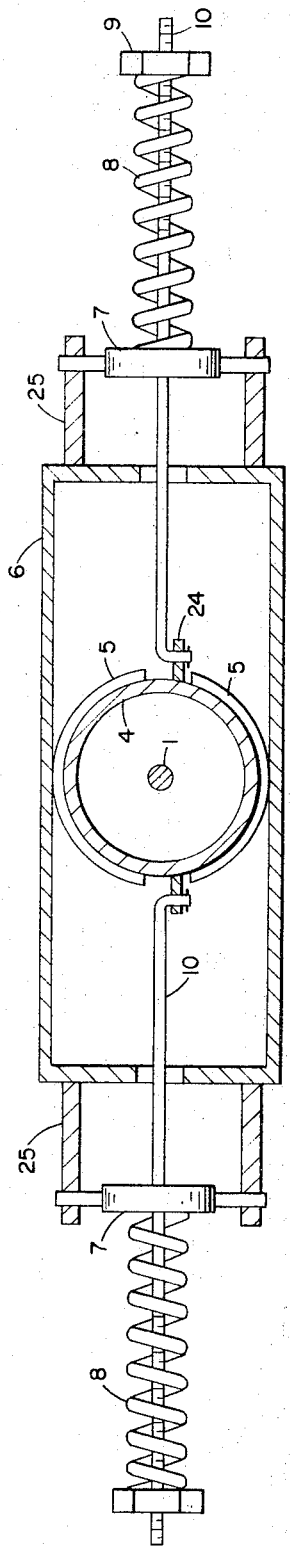
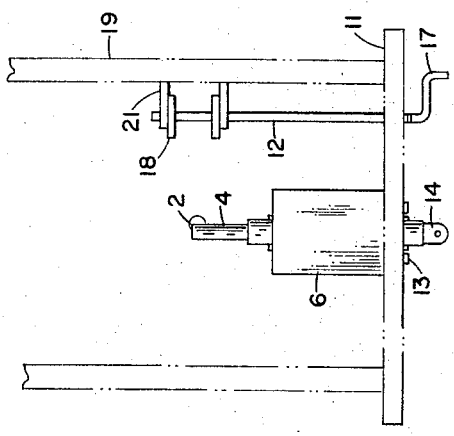
William H. Atkins
INVENTOR.
BY *J. Eugene Burts*
ATTORNEY United States Patent Office 3,345,082
Patented Oct. 3, 1967

3,345,082
FLEXIBLE CABLE TOWING HITCH
William Hammond Atkins, 446 Elm St., Clarksdale, Miss. 38614
Filed Jan. 28, 1965, Ser. No. 428,620
9 Claims. (Cl. 280—477)

This invention relates to a tow hitch and it deals more particularly with a flexible cable towing hitch, used to connect two objects together, such as towing devices. Said hitch can be attached to any object to be skidded, drawn, or towed in farm use, or to lower boats in or out of inaccessible places. Yet when said hitch is in towing position, it looks like any other spring hitch of the common type. These and other objects can be connected to any angle or degree and still be winched into towing position by means of a hand crank winch. This hitch will be used chiefly for towing four wheel trailers on farms and the like. Since it can be attached with very little effort, a person simply backs the towing vehicle as close as possible to the object to be towed. He then reels out as much cable as needed to obtain attachment. After said connection is made, then by crank means, said cable can be drawn in towing position. In the embodiment of my invention shown herein. Said cable is attached to a winch mounted on the frame of towing vehicle. Said cable extends from said winch over a sheave wheel mounted on a draw tube, said cable extending through said draw tube and out the rear end of said tube. Said cable has a wedge-shaped plate having two holes therein, one for a removable safety pin and the other one for a removable tow pin. Said plate is tapered to fit the opening in said draw tube. After said plate has been drawn into the end of said draw tube, a safety pin is then inserted in hole therein.

One of the primary objects of my invention, as will be obvious from the disclosure herein shown, is to provide a flexible cable towing hitch wherein the towed vehicle or object is, while being drawn or towed in the forward position or the reverse position, cushioned against sudden jarring or jerking by means of a constant compression biasing member adapted to provide the most suitable shock absorbing means for this type of action. In connection therewith, a further object of my invention and salient feature thereof will be to provide an adjustable compression means embodying constant compression resistance to shock. Like reference numerals are hereinafter used in the illustrated embodiment of my invention to designate like parts in the various views. The parts of the invention will be fully understood from the detailed description as follows:

FIG. 3 is a side view taken at line 3—3 of FIG. 1.

FIG. 4 is a rear elevation view of the existing bumper showing the partial elevation of an end view of housing taken from a rear view of FIG. 1.

FIG. 5 is a top view, showing housing and winch and the position they are mounted on towing vehicle frame.

FIG. 6 is a horizontal plan view, taken partly in section, through the extreme rear end of the draw tube member, extending inwardly through the rear bushing member, and outwardly through the rear plate wall of the housing, showing the horizontal alignment of the draw tube channel, the housing member and the mounting of the biasing spring means attached to the draw tube member and the housing.

Figure 1:
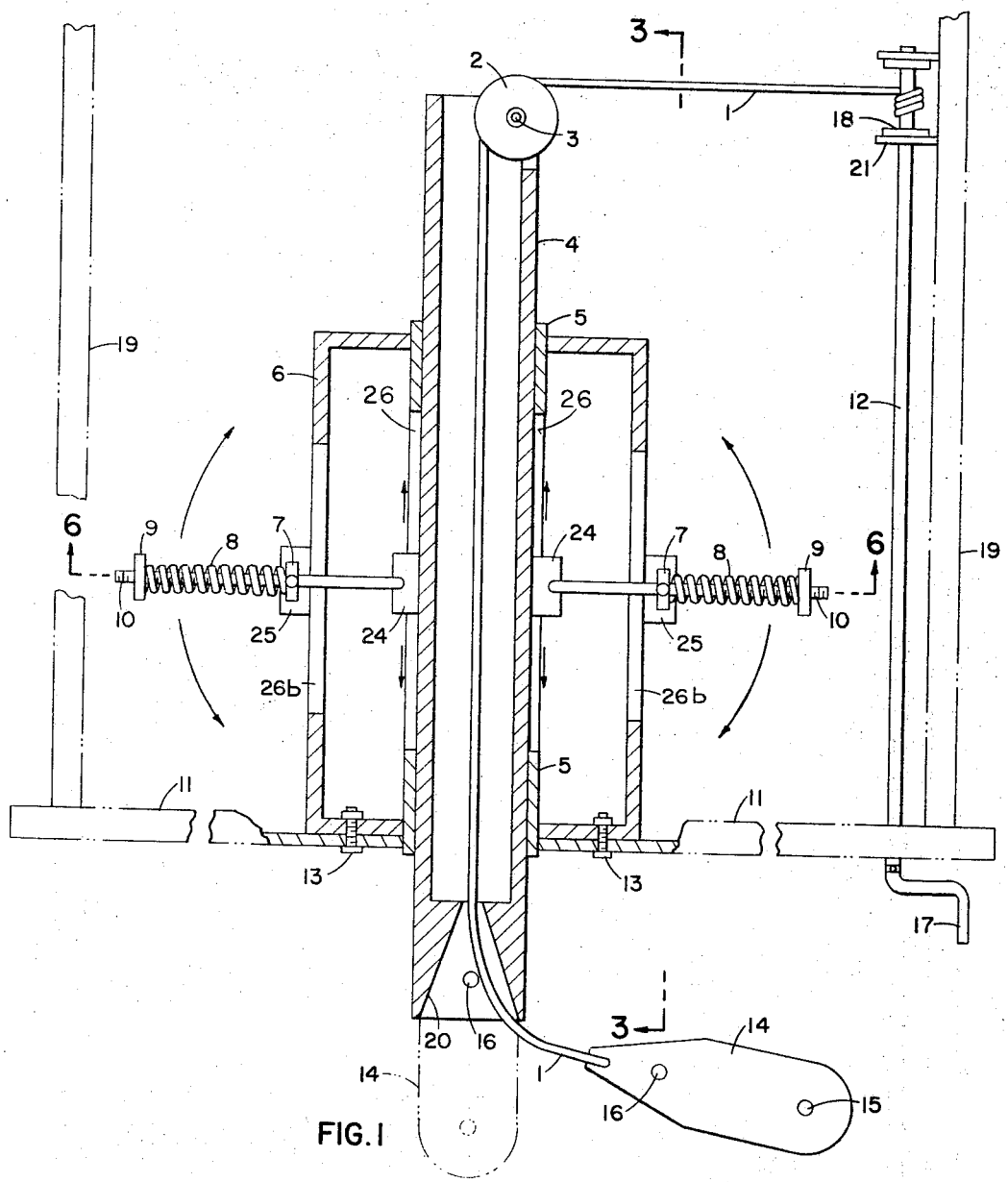
FIG. 1 is a top plan view of the main housing in cutaway, showing the slidable draw tube with lugs thereon, and guide bushings mounted in said housing, of the invention.

Referring more particularly to the drawings, in FIG. 1, it will be seen that the invention, for illustrative purposes, is mounted on the rear bumper of a towing vehicle. The bumper 11 is attached to the frame 19 of an automobile. The towing hitch of my invention is provided with an elongated housing 6 having an elongated lengthwise extending channel, which is provided at each end, in the embodiment shown, with a pair of stationary bushings 5.

The housing member in the illustration shown has bushings substantially annular in configuration adapted to receive an elongated tubular draw tube member 4. The draw tube member is of sufficient length such that when its center is disposed in corresponding position with the center of the housing a substantial portion of the draw tube member will project beyond the housing as shown in FIG. 1.

The draw tube member 4 is provided at its rearward end with a shaped opening or chamber 20 having a shape or configuration corresponding to the shape or configuration of a shaped tow plate member 14 which is adapted to be drawn into the chamber of the draw tube member and seated therein in the normal towing position.

The shaped plate member 14, in the illustration shown, is substantially wedge shaped, but it could be conical at its forward end and the chamber of the draw tube configuratively shaped to correspond. A forward end of the plate member 14 is provided with a hole 16 adapted to register with a corresponding hole 16b in the chamber of the draw tube, the aligned holes receiving a drop bolt which will lock the plate in place during the towing operation. The shaped plate is also provided at its rear end with a hole 15 by means of which attachment can be made to the object to be towed.

A cable 1 is attached to the shaped plate member and extends lengthwise through the channel of the draw tube member, to the forward end thereof, where it is received by a guiding means, a sheave wheel 2 pivotally connected by means of the pin 3 to the forward end of the draw tube member.

The cable 1 passes over the sheave wheel to a take-up means comprising a winch 18 adapted to receive and wind up the cable, and suitably connected to the frame 19 by means of brackets 21. The winch is provided with a suitable extended shaft 12, which projects through the bumper in a suitable hole as shown in FIG. 1 and FIG. 4. The outer end of this shaft extension is provided with a crank handle 17 by means of which the winch may be activated to draw the tow cable and the shaped plate into the recessed chamber at the rear of the draw tube member as shown.

Referring to FIG. 5, the general location and position of the housing and members can be readily shown. The cable is omitted from this drawing for the purpose of clarity.

Referring more particularly to FIGS. 1, 6, and 3, it can be seen that the housing 6 forms with the stationary bushings 5 a pair of lengthwise extending slots 26 and 26b on each side of the channel of the housing and draw tube member 4 adapted to receive a corresponding pair of traversely aligned lugs 24 on each side of the draw tube member. Attached to these lugs on each side are a pair of outwardly extending rods or rocker arms 10 threaded at their outer ends to receive adjustment nuts 9. The threaded rods or rocker arms are carried by collars 7 pivotally connected to brackets or flanges 25.

Threaded over the ends of the threaded rods or rocker arms 10 is a compressed spring 8 which is kept under constant compression with its rearward end impinging upon the outer face of the collar 7 and its outer end adjusted in compression along said rocker arms or rods by means of the adjustable nuts 9.

It can readily be seen from FIGS. 1 and 3 that if the draw tube member 4 reciprocates in forward and rearward movement in the channel of the housing member, the lugs 24 will strike upon the inner faces or ends of the slots 26, finally restricting the forward or rearward movement of the draw tube member.

Figure 2:
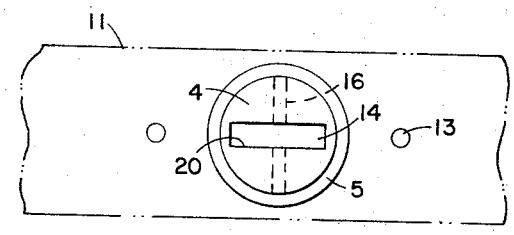
FIG. 2 is a rear view of the structure of a portion of FIG. 1.

However, assuming that an object to be towed has been attached to the shaped plate member 14 by means of the holes 15, when the plate member is drawn into the chamber 20 as indicated in FIG. 2 and FIG. 5 the object is in the hitched position and the reciprocal movement of the draw tube member within the housing will be first restricted by the movement of the threaded rocker arms 10 which will be limited in their motion by the compression spring member 8.

In operation, when the invention is mounted on the rear bumper of a towing vehicle, it is assembled with a strong compression on the spring 8 such that almost only a complete stoppage of the towed vehicle in the line of travel would cause the lugs 24 to travel a sufficient distance, either forward or rearward, to strike the ends of the slots 26 as indicated. The normal operation of the mechanism is such that strong compression is always maintained on the compression spring as the unit is assembled.

In normal use, the towing vehicle would be maneuvered into position near the object to be picked up and towed; for example, a trailer. The shaped plate 14 would be attached at its outer end to the trailer, in such case, with the cable 1 pulled out and extended in length into the most convenient spot for pick up of the trailer. The towing vehicle could be parked a number of feet away, and facing in a different direction.

By means of the winch 18, a cable 1 would be drawn into the end of the draw tube member 4, until the plate is seated in the chamber 20 and the locking nut placed in the end of such bolt or simply a locking bolt inserted in the holes 16, thereby affixing the object to be towed to the end of the draw tube member. A cable can be held on the winch by a suitable ratchet and the handle 17 removed or allowed to remain in position.

With the towed object thus in position, drawn into place by means of the cable, the towing vehicle can then move forward. The draw tube member 4 takes up the shock in such case, moving with a constant cushioning effect under constant compression resistance against the spring 8. This cushioning effect is much more pronounced, and is much more constant than where such cushioning is achieved by a spring under tension. It is also more easily possible to adjust the amount of compression resistance on the spring 8 by means of the adjusting nuts 9 than is possible with a spring under tension.

With the present invention, the draw tube, as it reciprocates, is drawn with a more smooth action through the central position in the housing under the constant compression resistance of the spring than would be possible under a tension resistance of a spring, thereby making for a more efficiently operating shock absorbing hitching member.

However, while other hitching means have previously been provided with their shock absorbing means in axial alignment it can be seen that a greater advantage is obtained in lengthening the longitudinal shock factor by translating the longitudinal shock absorbing means from the longitudinal axis to a resolution of forces opposing said shock off of said axis and transversely thereof, under constant compression, thereby eliminating a momentary jerk in the towed vehicle as the lines of forces change direction forward and rearwardly.

Hence it can be shown that a compression spring member is a much more efficient and less yielding member than a tension spring, the combination of these forces in the direction indicated makes for a more smoothly operating, less shock receiving mechanism, translating less shock to the vehicle to be towed. This could be of prime importance where the towed vehicle might be one containing explosives or chemicals sensitive to shock.

From the foregoing, it will be seen that the invention is well adapted to attain the ends and objects hereinbefore set forth, together with other advantages which are obvious and which are inherent to the invention.

It will be understood that certain features and sub-combinations are of utility and may be employed without reference to other features and sub-combinations. This is contemplated by and is within the scope of the claims.

Inasmuch as many possible embodiments of the invention may be made without departing from the scope thereof, it is to be understood that all matter herein set forth or shown in the accompanying drawings is to be interpreted as illustrative and not in a limiting sense.

I claim:

1. A flexible cable towing hitch of the character described comprising in combination, a housing member and a draw tube member, each having a centrally disposed lengthwise channel, said housing member being attached to the frame of a tow vehicle, means supporting said draw tube member with the same reciprocally telescoping into the channel of said housing member and projecting therefrom in forward and rearward relation thereto, a tow cable received and extending through the channel of said draw tube member from the forward end and projecting rearwardly therefrom, corresponding means on said housing member and draw tube member limiting the forward and rearward reciprocal movement of the draw tube in said housing member, means biasing the center of said draw tube in a normally centrally disposed position lengthwise of said housing member, said draw tube member having a configuratively shaped chamber in the rear end thereof provided with a centrally disposed aperture admitting the passage of said tow cable therethrough, a hitching plate member correspondingly shaped at its forward end to be received by said chamber and having attached thereto said tow cable, means on said hitching plate member for attachment of a towed object, corresponding locking means on the forward end of said hitching plate member and receiving end of said draw tubes for securing said plate to the tube, directional guiding means on the forward end of said draw tube receiving the tow cable such as to cause the same to be freely drawn therethrough, cable take-up means disposed in relation to the forward end of the draw tube and housing member and connected with said cable operable to cause said hitching plate member to be drawn by the cable taken up thereon into the shaped rear chamber of said draw tube member.

2. A flexible cable towing hitching of the character described in claim 1, wherein said means supporting the draw tube member in the channel of the housing member comprises a pair of oppositely disposed axially aligned stationary bushings formed in the channel of said housing member.

3. A flexible cable towing hitch of the character described in claim 1, wherein said corresponding means on said housing member and draw tube member limiting the reciprocal movement of said draw tube comprises a pair of transversely aligned slots extended lengthwise in said housing member located between lengthwise axially aligned stationary bushings in the channel of said housing member supporting said draw tube member, and a corresponding pair of transversely aligned lugs on said draw tube projecting through said slots to impinge upon the opposite ends thereof.

4. A flexible cable towing hitch of the character described in claim 1, wherein said means biasing the center of said draw tube in a normally centrally disposed position lengthwise of said housing member comprises a corresponding pair of transversely aligned lugs located on the opposite sides of said draw tube and disposed centrally thereof, transversely projecting rocker arms pivotally connected to said lugs, connecting means on said housing centrally disposed thereon opposite said lugs receiving said rocker arms in pivotal and reciprocal movement thereon extending outwardly from the pivotal axis thereof, and compression spring means disposed between said connecting means and the outer ends of said rocker arms drawing the same outwardly and causing the center of said draw tube to be normally urged to the midpoint of said housing member channel.

5. A flexible cable towing hitch of the character described in claim 4, wherein said connecting means on said housing member comprises a pivotally mounted collar thereon receiving a rocker arm projecting and extending lengthwise therethrough and reciprocal therein.

6. A flexible cable towing hitch of the character described in claim 4, wherein said compression spring means comprises a precompressed spring interposed along said rocker arm between said connecting means and the outer end of said rocker arm, said spring being compressed in alignment between said connecting means and a compression adjustment nut affixed to the said outer end of said arm, such as to cause said arm in its reciprocating movement to be urged outwardly under constant compression resistance.

7. A flexible cable towing hitch of the character described in claim 1, wherein said corresponding locking means on the forward end of said hitching plate member and receiving end of said draw tube compresses a pair of axially aligned holes in said plate member and tube disposed to receive a locking pin when said plate member is seated therein.

8. A flexible cable towing hitch of the character described in claim 1, wherein said cable take-up means comprises a cable winch disposed opposite the forward end of said draw tube receiving the cable therefrom and having an operating handle extending to the hitching area for said draw tube.

9. A flexible cable towing hitch of the character described comprising in combination, a housing member and a draw tube member, each having a centrally disposed lengthwise channel, said housing member being attached to the frame of a tow vehicle, a pair of oppositely disposed axially aligned bushings supporting said draw tube member with the same reciprocally telescoping into the channel of said housing member and projecting therefrom in forward and rearward relation thereto, a tow cable received and extending through the channel of said draw tube member from the forward end and projecting rearwardly therefrom, a pair of transversely aligned extended lengthwise slots in said housing member located between said axially aligned bushings, transversely aligned centrally disposed lugs on said draw tube member projecting through said slots and limiting the reciprocal movement of said tube by impinging upon the opposite ends of said slots, outwardly projecting transversely aligned extended rocker arms pivotally connected to said lugs, centrally disposed transversely aligned brackets on said housing member, collars pivotally connected to said brackets receiving the extended ends of said rocker arms projecting therethrough, said rocker arms carrying in axial alignment thereon between said collar and the projecting outer end thereof a coiled spring member compressed by an adjusting nut on the outer end of said arms such as to constantly bias said rocker arms outwardly and said draw tube in the centrally disposed position relative to said housing under constant compression resistance, an inwardly converging chamber in the rearward end of said draw tube member, a hitching plate member correspondingly shaped at its forward end to the chamber of said draw tube to seat therein, said hitching plate member having means at its rearward end for attachment to an object to be towed and said tow cable attached to its forward end, means comprising a guide and winch for drawing said hitching plate member attached to said cable into said draw tube chamber disposed to receive said cable from said draw tube, locking means on said hitching plate member and said draw tube chamber comprising a pair of aligned holes thereon to receive a pin projecting therethrough such as to cause said plate member to be secured to said tube while towing.

References Cited
UNITED STATES PATENTS

| | | | |
|---|---|---|---|
| 2,135,972 | 11/1938 | Garlinger | 280—477 |
| 2,150,010 | 3/1939 | Solomon | 280—477 |
| 2,170,983 | 8/1939 | Adams | 280—478 |
| 2,753,192 | 7/1956 | Davis et al. | 280—477 |

FOREIGN PATENTS

| | | |
|---|---|---|
| 333,238 | 2/1921 | Germany. |

LEO FRIAGLIA, *Primary Examiner.*